United States Patent [19]

Huneke

[11] Patent Number: 4,913,471
[45] Date of Patent: Apr. 3, 1990

[54] SWIVEL JOINT

[76] Inventor: Gerald L. Huneke, Raasch's Ranch, Lot 32, Zumbrota, Minn. 55992

[21] Appl. No.: 119,159

[22] Filed: Nov. 10, 1987

[51] Int. Cl.$^4$ .............................................. F16L 27/08
[52] U.S. Cl. ............................................ 285/281; 285/377
[58] Field of Search ............... 285/275, 281, 377, 362, 285/331

[56] References Cited

U.S. PATENT DOCUMENTS

| | | | |
|---|---|---|---|
| 626,932 | 6/1899 | Reed et al. | 285/377 X |
| 676,846 | 6/1901 | Moran | 285/281 |
| 1,020,258 | 3/1912 | Bundy | 285/402 X |
| 1,075,693 | 10/1913 | Cassidy | 285/281 |
| 2,149,119 | 2/1939 | Funke | 285/281 X |
| 2,509,090 | 5/1950 | Faccou | 285/281 |
| 2,833,568 | 5/1958 | Corsette | 285/281 |
| 3,649,052 | 3/1972 | Snyder, Jr. | 285/362 X |
| 3,880,120 | 4/1975 | Shulick | 285/281 X |
| 3,998,479 | 12/1976 | Bishop | 285/133 |
| 4,005,881 | 2/1977 | Burton et al. | 285/111 |
| 4,039,212 | 8/1977 | Skarud | 285/253 |
| 4,039,213 | 8/1977 | Walters | 285/317 |
| 4,045,058 | 8/1977 | Eross | 285/119 |
| 4,098,526 | 7/1978 | DuBois | 285/119 |
| 4,099,744 | 7/1978 | Kutnyak et al. | 285/7 |
| 4,099,748 | 7/1978 | Kavick | 285/256 |
| 4,123,035 | 10/1978 | Boudreau | 251/146 |
| 4,152,014 | 5/1979 | Soeffker | 285/7 |
| 4,168,090 | 9/1979 | Kaufmann, Jr. | 285/419 X |
| 4,223,919 | 9/1980 | Kurachi | 285/8 |
| 4,239,083 | 12/1980 | Silberman et al. | 166/117 |
| 4,325,571 | 4/1982 | Funderburg et al. | 285/177 |
| 4,354,698 | 10/1982 | Linder et al. | 285/98 |
| 4,369,991 | 1/1983 | Linder | 285/38 |
| 4,407,533 | 10/1983 | Giebeler | 285/281 |
| 4,412,693 | 11/1983 | Campanini | 285/39 |
| 4,437,690 | 3/1984 | Drath | 285/272 |
| 4,499,854 | 2/1985 | Hoefelmayr et al. | 119/14.32 |
| 2,542,701 | 2/1951 | Press | 285/281 |
| 4,616,948 | 10/1986 | Jelfs | 403/5 |
| 4,619,612 | 10/1986 | Weber et al. | 433/80 |
| 4,626,004 | 12/1986 | Geberth, Jr. | 285/122 |
| 4,647,076 | 3/1987 | Pollack et al. | 285/95 |

FOREIGN PATENT DOCUMENTS

| | | | |
|---|---|---|---|
| 653532 | 10/1964 | Belgium | 285/281 |
| 760940 | 11/1956 | United Kingdom | 285/377 |

Primary Examiner—Thomas F. Callaghan
Attorney, Agent, or Firm—Kinney & Lange

[57] ABSTRACT

A swivel joint having a connection means rotatable within another connection means held together by a lock means.

12 Claims, 2 Drawing Sheets

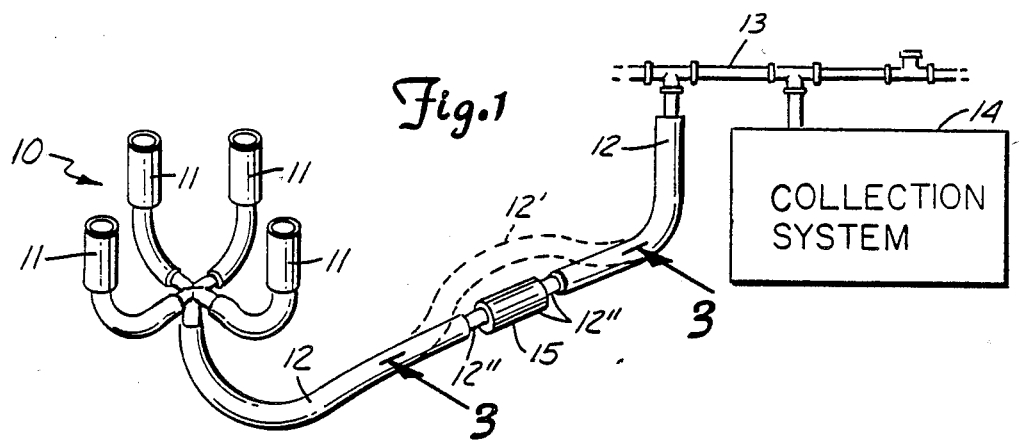
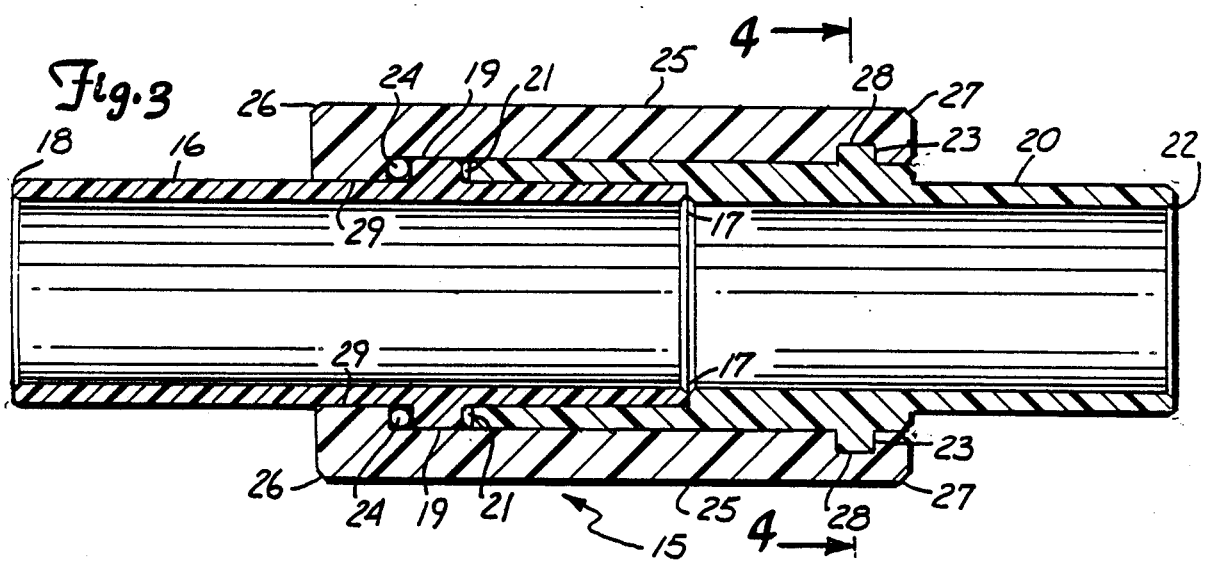
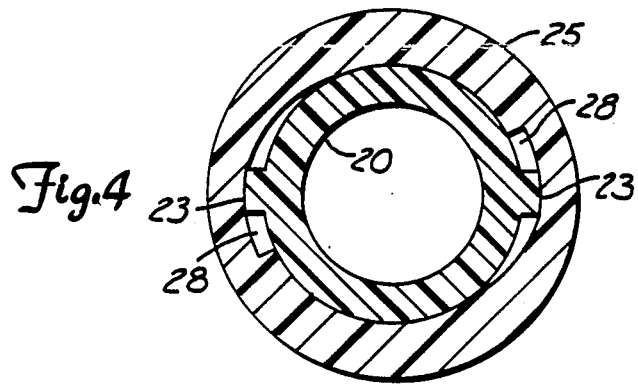

SWIVEL JOINT

BACKGROUND OF THE INVENTION

The present invention relates to swivel joints used to join tubular conduits and, more particularly, to such swivel joints which can be disassembled and assembled quickly and conveniently.

Hoses, tubes, and the like have many uses. In those situations where they extend for some length so that the user at one end is some distance from the other, the manipulations by the user at that one end can lead to twists occurring in such conduits.

One situation in which this occurs is in the use of milking machines In FIG. 1, a milking machine system is partially shown with its milking machine claw, 10, having the usual teat cups, 11. The claw is connected to a flexible milk line, 12, (partially shown by dashed lines in a section, 12', ignoring an alternative path, 12", for now) leading to a pipeline, 13, typically installed permanently in a barn. Pipeline 13 continues to the milk collection system, 14.

As milking of one cow is completed, claw 10 is transferred from that cow to another. This milking and transferring continues until the completion of the milking of all of the cows present. In such transferrings of claw 10, it is rather easy to introduce twists in milk line 12 as a part of manipulating claw 10 into position on one cow, then removing it and transporting it to the next cow, and again positioning it on that next cow. These operations, carried out over a series of cows, provide opportunities for a significant amount of twisting of line 12 (including 12') to occur unless the operator is quite attentive to this possibility and takes steps to avoid such occurrences.

A sufficient twisting in milk line 12 (including 12') leads to reactive forces in that milk line which will cause claw 10 to pull on its teat cups connected to the teats on one side of a cow's udder with greater force than on those on the other side. The additional force on those teats subjected thereto leads to the milk supply in the udder at the time of milking to become exhausted at these teats more quickly than those on the side of the udder subjected to a lesser tensile force. As a result, the vacuum system in collection system 14, which acts to cause the milking action, continues to draw on the teats on the empty side of the udder while completing the milking of the others on the side not yet emptied.

Such continued applications of vacuum to the teats of the cow at the locations that can no longer supply milk leads to irritation of the tissue in the teats. Such an irritation can lead to an infection of these tissues which in turn leads to an increase in the white cells in the blood in the area of the infected tissues. Such an increase in white cells in the blood at this location leads to an increase in somatic cells being shed into the milk, a situation which can lower the value of the milk since it prevents making of certain milk by-products such as cheese.

Further, such continued application of vacuum to the teats of the cow through which milk can no longer be supplied can damage the sphincter valve in the teat. The vacuum acts to distort the tissue which again can lead to an infection and serious deterioration in the ability of the sphincter valve to operate as it should.

Finally, by having one side of the udder exhaust its milk supply first and then the other, the time to complete milking of a cow is lengthened. Finishing both sides at approximately the same time leads to a shorter milking time per cow.

Thus, there is desired a milking machine arrangement which will avoid these problems despite actions by the operator which would introduce twists into the milk line. Such an arrangement should be economical and have structures which can be inspected and cleaned easily.

SUMMARY OF THE INVENTION

The present invention provides a swivel joint along a conduit, such as a hose or a tube, that permits the section on one side of the swivel joint to rotate with respect to the one on the other side to thereby prevent twists occurring in the conduit. The swivel joint has first and second conduit connection means one of which can be fitted inside the other so as to be able to rotate therein. A sealing means structure is provided on at least one of the conduit connections so that a locking sleeve with a seal engagement arrangement, fitted over the two conduit connection means with its sealing engagement means engaging the sealing establishment means on the one conduit connection means, is able to rotate with respect to the lock means. The lock means over both of the conduit connection means keeps them together, one inserted in the other. A second seal can be provided between the lock means and the other conduit connection means held by the lock means.

The lock means can hold the conduit connection means being held thereby through friction between surfaces of the two, or by a seal arrangement between the two. Alternatively, a positive locking arrangement can be provided through a protrusion on one being inserted into a slot arrangement in the other.

BRIEF DESCRIPTION OF THE DRAWINGS

FIG. 1 shows a system in which to incorporate the present invention,

FIG. 3 shows a cross section view of the present invention as assembled,

FIG. 4 shows another cross section view of the present invention as assembled.

DETAILED DESCRIPTION OF THE PREFERRED EMBODIMENTS

The difficulties due to the twisting of line 12, if section 12' of FIG. 1 is included, can be alleviated by introducing alternative section 12" therein. Section 12" includes a swivel joint, 15, which permits twisting and turning of claw 10 without an ensuing twist being introduced in line 12 with section 12".

Figure 2:
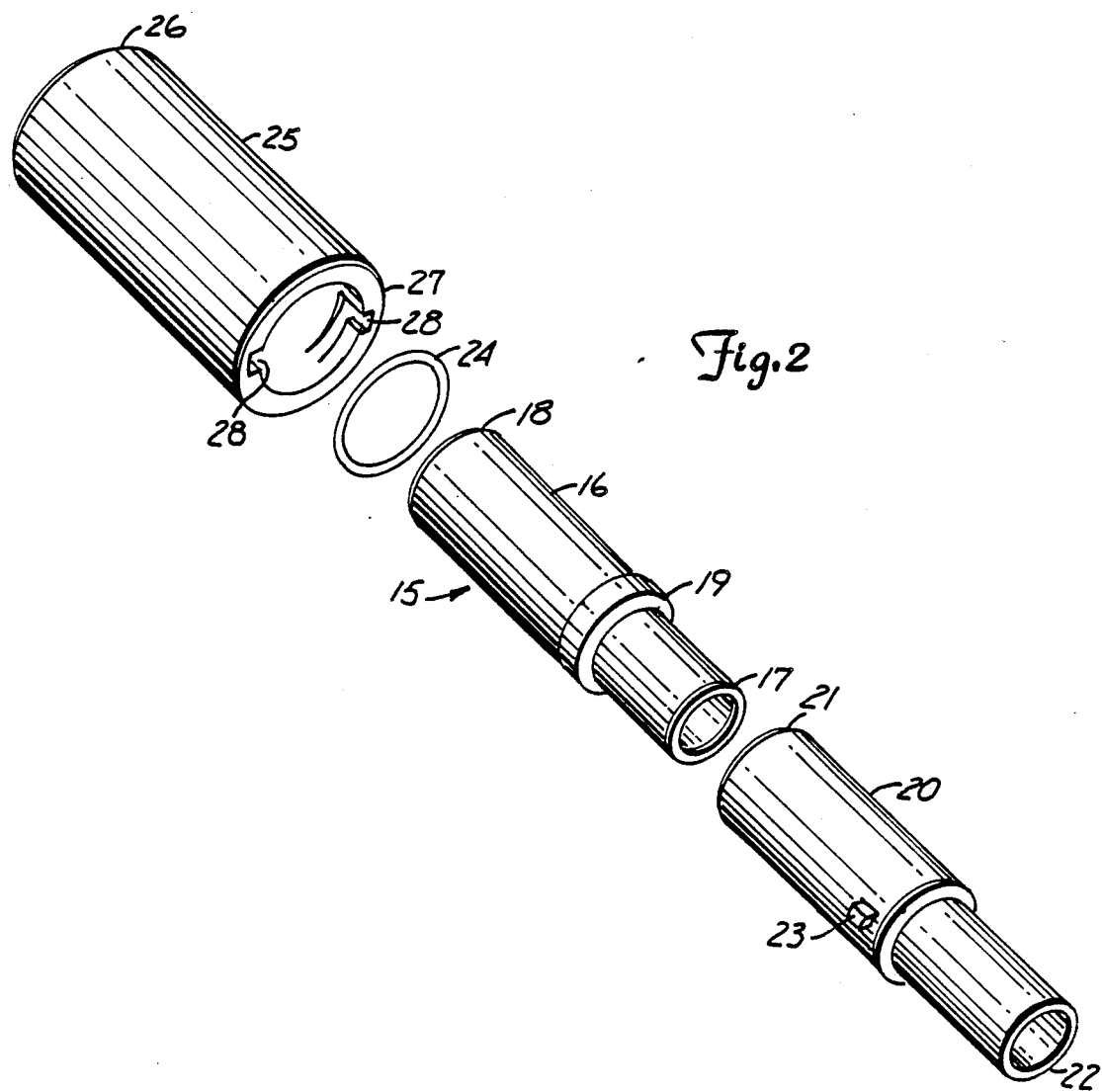
FIG. 2 shows an exploded view of the present invention.

FIG. 2 shows an exploded view of swivel joint 15. There is shown a first connection tube-like portion, 16, having an inner end, 17, and an outer end, 18, which can be connected to a portion of line 12 on one side of section 12". Between inner end 17 and outer end 18 is located a collar, 19, around the periphery of the outer surface of the tube wall of tubular connection 16. The outer surface periphery at end 17 of tubular connection 16 is circular as is the inner surface periphery, and this is true also at outer end 18.

A second tubular connection, 20, also has an inner end, 21, and an outer end, 22. Tubular connection 20 has a structure similar to two overlapped hollow cylinders with one including inner end 21 having a greater inner diameter than the outer diameter of the other which includes outer end 22. The tube wall at inner end 21 has an outer surface with a periphery which follows a circle and an inner surface with a periphery which also follows a circle. The diameter of this inner surface at inner end 21 is such that inner end 17 of tubular connection 16 can be inserted in tubular connection 20 at its end 21 and be able to rotate in that location. This results in tubular connection 16 being rotatable with respect to tubular connection 20.

End 22 of tubular connection 20 also has a wall with an outer surface that has a circular periphery and an inner surface which has a circular periphery but of a smaller diameter than the inner surface of the tube wall at end 21. In addition, a locking protrusion, 23, is shown protruding radially outward from the outer surface of the tube wall of tubular connection 20 which will be used for locking the swivel joint together as will be described below.

An elastomer ring, 24, has a diameter large enough to be slid over outer end 18 of tubular connection 16. Ring 24 can be slipped over the outer surface of end 18 of tubular connection 16, and then slid onward to rest against the left side of collar 19 in FIG. 2.

A tube-like locking sleeve, 25, having a first end, 26, and a second end, 27, slides over both tubular connections 16 and 20. This, in a completed assembly, is done with end 17 of tubular connection 16 inserted within the interior of tubular connection 20 at end 21 thereof. Locking sleeve 25 has a first locking slot, 28, having a portion with its length oriented parallel to the longitudinal axis of locking sleeve 25, and a portion with its length oriented perpendicular to that axis. The construction of slot 28 into which protrusion 23 is inserted is better seen for a second but similar slot 28 on the right-hand side of locking sleeve 25 in FIG. 2. This second slot 28 accommodates a second radial protrusion 23 from the outer surface of tubular connection 20 which is hidden in the view of FIG. 2. Such a second protrusion 23 and second slot 28 need not necessarily be provided if the first protrusion 23 and first slot 28 are used, but can be provided anyway to distribute forces more evenly in the assembled swivel joint or to increase the tensile strength of the locked assembly.

The assembly of these items described in connection with FIG. 2 is shown in FIG. 3. As can be seen in FIG. 3, the diameter of the inner surface of locking sleeve 25 from end 27 inward for most of the length of locking sleeve 25 is large enough to slide over the outer surface of collar 19 and the outer surface of tubular connection 20. Of course, to do this, protrusions 23 must be aligned to slide into those portions of slots 28 oriented parallel to the longitudinal axis of locking sleeve 25. Near end 26, however, of locking sleeve 25 there is a shoulder portion, 29, with a circular opening of a smaller diameter than the interior diameter of the remainder of the sleeve, a diameter sufficient to just permit end 18 of tubular connection 16 to project therethrough.

As a result, locking sleeve 25 can be slid over the assembled combination of tubular connection 16 inserted into tubular connection 20, as described above, to the point where shoulder 29 of locking sleeve 25 presses elastomer ring 24 against collar 19 of tubular connection 16. At that point, protrusions 23 from tubular connection 20 are fully into the portions of slots 28 which are oriented parallel to the longitudinal axis of locking sleeve 25. In that location, a counterclockwise turn of locking sleeve 25 with respect to tubular connection 20 results in protrusions 23 being positioned in the portions of slot 28 oriented perpendicular to the longitudinal axis of locking sleeve 25 as shown in FIG. 4.

In this position, locking sleeve 25 and tubular connection 20 are locked together such that tube 20 cannot be removed from locking means 25 by forces applied parallel to the longitudinal axis of locking means 25. Thus, swivel joint 15 is assembled and locked together with locking sleeve 25 holding tubular connection 16, by shoulder 29 thereof, inserted into tubular connection 20 in sleeve 25 trapping which is held by slots 28 locking protrusions 23. A clockwise turn of sleeve 25 with respect to tubular connection 20 will release the combination of tubular connections 16 and 20 quickly and easily for a quick disassembly of the joint for inspection or for cleaning or other purposes.

A further possibility is to eliminate slots 28 and protrusions 23 altogether and have locking sleeve 25 hold tubular connection 20 by pressing thereagainst, i.e. a press fit. This can be accomplished by increasing the diameter of the outer surface of tubular projection 20 along the periphery thereof where protrusions 23 are currently provided. Thus, pressing tubular connection 20 into place within locking sleeve 25 will result in friction forces holding them together in that position with tubular connection 16 inserted in tubular connection 20.

Figure 5:
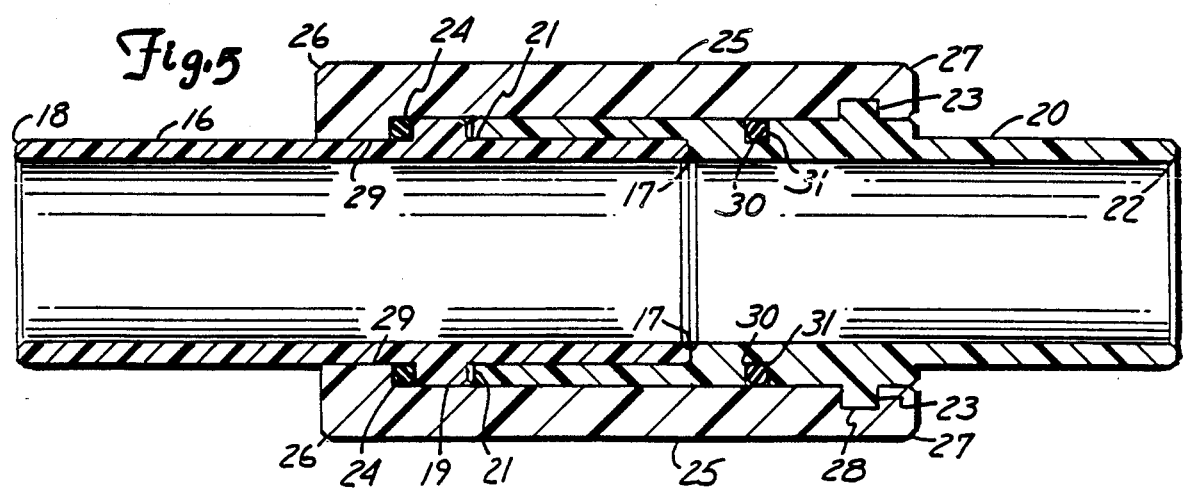
FIG. 5 shows a cross section of an alternative version of the present invention as assembled.

Yet a further possibility is to use a frictional fit, but provided not by an increased diameter of the outer surface of tubular connection 20, but rather by introducing a further sealing arrangement such as a groove in and around tubular connection 20 at its outer periphery near where protrusions 23 have been shown with another elastomer ring therein. The pressing of locking sleeve 25 against such an elastomer ring could provide a sufficient holding of tubular connection 20 in some circumstances. This is shown in FIG. 5 where a further elastomer ring, 30, has been provided in a slot, 31, in tubular connection 20 somewhat toward inner end 21 thereof with respect to outer end 22. In situations where a stronger holding force is required, protrusions 23 in slots 28 can be again provided in addition to this seal as has been shown in FIG. 5. In this circumstance, a sealing arrangement is provided by ring 30, and the holding force is primarily provided by protrusions 23 in slots 28.

Although the present invention has been described with reference to preferred embodiments, workers skilled in the art will recognize that changes may be made in form and detail without departing from the spirit and scope of the invention.

What is claimed is:

1. A swivel joint means for joining first and second conduit means so as to provide a passageway therebetween and yet permit one of said first conduit means to rotate with respect to said second conduit means, said swivel joint means comprising:

a tubular first conduit connection means adapted for having a first end thereof connected to said first conduit means and having a substantially circular outer periphery of its tube wall being of a selected outer diameter at a second end thereof, said first conduit connection means having a first outer seal establishment means about its outer wall periphery and located between said first and second ends thereof;

a tubular second conduit connection means having a first end thereof adapted for connection to said second conduit means and having a substantially circular inner periphery of its tube wall being of a selected inner diameter at a second end thereof, said inner diameter being of a sufficient size with respect to said first conduit connection means second end outer diameter for said first conduit connection means second end to be inserted within said second conduit connection means at said second end thereof and therein being capable of being rotated to thereby permit said first conduit connection means to rotate with respect to said second conduit connection means; and a tubular lock means having an opening in each of first and second ends thereof and having a first inner seal engaging means about an inner periphery of its tube wall, said first conduit connection means extending through said lock means first end opening sufficiently to expose said first conduit connection means first end such that said first inner seal engaging means is against said first outer seal establishment means to form a seal between said first conduit connection means and said lock means which permits said first conduit connection means to rotate with respect to said lock means, said second conduit connection means extending through said lock means second end opening to expose said second conduit connection means second end with said lock means second end, through a holding means thereat, engaging and holding said second conduit connection means so that said first conduit connection means is kept inserted therein as aforesaid.

2. The apparatus of claim 1 wherein said lock means holds said second conduit connection means, as aforesaid, through said holding means forming a seal therebetween suing a second outer seal establishment means formed about an outer periphery of said second conduit connection means tube wall and a second inner seal engaging means formed about an inner periphery of said lock means tube wall.

3. The apparatus of claim 1 wherein said lock means holds said second conduit connection means, as aforesaid, through said holding means having said lock means tube wall pressing on said second conduit connection means tube wall.

4. The apparatus of claim 1 wherein said lock means holds said second conduit connection means, as aforesaid, through said holding means having a radial protrusion located on an outer surface of said second conduit connection means tube wall being positioned within a slot at an interior surface of said lock means tube wall.

5. The apparatus of claim 1 wherein said first outer seal establishment means comprises a collar formed about said first conduit connection means outer wall periphery and an elastomeric ring positioned about said first conduit connection means against said collar.

6. The apparatus of claim 1 wherein said first conduit means is connected at one end thereof to said first conduit connection means and is connected at its other end to a vacuum maintenance means.

7. The apparatus of claim 2 wherein said second outer seal establishment is formed by a slot at an outer surface of said second conduit connection means extending around said outer surface in which is positioned an elastomeric ring, and said second inner seal engaging means is an interior surface of said lock means tube wall.

8. The apparatus of claim 3 wherein said second conduit connection means has a circular outer wall with a location between said first and second ends thereof having a greater diameter than locations closer to said second end thereof.

9. The apparatus of claim 4 wherein said slot has a first portion parallel to a longitudinal axis of said lock means and an adjoining second portion perpendicular to said longitudinal axis.

10. The apparatus of claim 7 wherein said lock means holds said second conduit connection means, as aforesaid, through said holding means having a protrusion located on an outer surface of said second conduit connection means tube wall being positioned within a slot at an interior surface of said lock means tube wall.

11. The apparatus of claim 10 wherein said slot has a first portion parallel to a longitudinal axis of said lock means and an adjoining second portion perpendicular to said longitudinal axis.

12. A swivel joint means for joining first and second conduit means so as to provide a passageway therebetween and yet permit one of said first conduit means to rotate with respect to said second conduit means, said swivel joint means comprising:

a tubular first conduit connection means adapted for having a first end thereof connected to said first conduit means and having a substantially circular outer periphery of its tube wall being of a selected outer diameter at a second end thereof, said first conduit connection means having a first outer seal establishment means about its outer wall periphery and located between said first and second ends thereof;

a tubular second conduit connection means having a first end thereof adapted for connection to said second conduit means and having a substantially circular inner periphery of its tube wall being of a selected inner diameter at a second end thereof, said inner diameter being of a sufficient size with respect to said first conduit connection means second end outer diameter for said first conduit connection means second end to be inserted within said second conduit connection means at said second end thereof and therein being capable of being rotated to thereby permit said first conduit connection means to rotate with respect to said second conduit connection means free of any structure located therebetween; and a tubular lock means having an opening in each of first and second ends thereof and having a first inner seal engaging means about an inner periphery of its tube wall, said first conduit connection means extending through said lock means first end opening sufficiently to expose said first conduit connection means first end such that said first inner seal engaging means is against said first outer seal establishment means to form a seal between said first conduit connection means and said lock means which permits said first conduit connection means to rotate with respect to said lock means, said second conduit connection means extending through said lock means second end opening to expose said second conduit connection means second end with said lock means second end, through a holding means thereat, engaging and holding said second conduit connection means so that said first conduit connection means is kept inserted therein as aforesaid.

* * * * *

UNITED STATES PATENT AND TRADEMARK OFFICE
CERTIFICATE OF CORRECTION

PATENT NO. : 4,913,471
DATED : April 3, 1990
INVENTOR(S) : Gerald L. Huneke

It is certified that error appears in the above-identified patent and that said Letters Patent is hereby corrected as shown below:

Column 5, line 38, delete "suing" and insert --using--.

Column 6, line 12, after "having a" insert --radial--.

Signed and Sealed this

Twenty-sixth Day of November, 1991

Attest:

HARRY F. MANBECK, JR.

*Attesting Officer*  *Commissioner of Patents and Trademarks*